US012700021B2

(12) United States Patent
Singh

(10) Patent No.: US 12,700,021 B2
(45) Date of Patent: Aug. 4, 2026

(54) SYSTEM AND METHOD TO MANAGE DIGITAL ASSETS

(71) Applicant: Ravneet Singh, Coral Springs, FL (US)

(72) Inventor: Ravneet Singh, Coral Springs, FL (US)

(73) Assignee: Ravneet Singh

( * ) Notice: Subject to any disclaimer, the term of this patent is extended or adjusted under 35 U.S.C. 154(b) by 169 days.

(21) Appl. No.: 18/503,511

(22) Filed: Nov. 7, 2023

(65) Prior Publication Data

US 2024/0152580 A1 May 9, 2024

Related U.S. Application Data

(60) Provisional application No. 63/423,461, filed on Nov. 7, 2022.

(51) Int. Cl.
*G06F 21/10* (2013.01)
*G06Q 10/40* (2026.01)
(Continued)

(52) U.S. Cl.
CPC .............. *G06F 21/10* (2013.01); *G06Q 10/40* (2026.01); *G06Q 30/0279* (2013.01); *G06Q 50/186* (2013.01); *H04L 9/50* (2022.05)

(58) Field of Classification Search
None
See application file for complete search history.

(56) References Cited

U.S. PATENT DOCUMENTS 8,196,063 B2 * 6/2012 Apparao ............... G06F 16/437
715/811
10,554,753 B2 * 2/2020 Tormasov ........... H04L 41/5019
(Continued)

FOREIGN PATENT DOCUMENTS

WO   WO-2013040037 A1 *   3/2013   ............. H04L 51/04
WO   WO-2021174139 A1 *   9/2021   ........... G06Q 50/188
WO   WO-2023287969 A1 *   1/2023   ............. G06Q 50/18

OTHER PUBLICATIONS

Joshua A.T. Fairfield. "Tokenized: The Law of Non-Fungible Tokens and Unique Digital Property Tokenized: The Law of Non-Fungible Tokens and Unique Digital Property." (2022). Retrieved online Jun. 23, 2025. https://scholarlycommons.law.wlu.edu/context/wlufac/article/1738/viewcontent/97IndLJ.pdf (Year: 2022).*

(Continued)

*Primary Examiner* — James A Reagan
(74) *Attorney, Agent, or Firm* — Jason C. Cameron

(57) ABSTRACT

System and method for managing digital assets is disclosed. The system and method provide automated distribution of royalties and fundraising using non-dynamic or dynamic Non-Fungible Tokens (NFTs) generated from social media entities. The system incorporates blockchain technology, smart contracts, and a unique algorithm to automate the distribution of royalties to one or more recipients and facilitate fundraising through NFT sales. The system addresses the challenges in existing systems by introducing a novel approach to NFT creation, distribution, and valuation based on social media voice (SMV) scores. The system and method provide a comprehensive solution to streamline the creation, valuation, and distribution of NTTs in the context of social media, enhancing transparency, and automating various processes for royalties, fundraising, and rewards.

16 Claims, 4 Drawing Sheets

(51) Int. Cl.

| | | |
|---|---|---|
| *G06Q 30/0279* | (2023.01) | |
| *G06Q 50/18* | (2012.01) | |
| *H04L 9/00* | (2022.01) | |

(56) References Cited

U.S. PATENT DOCUMENTS

| | | | | |
|---|---|---|---|---|
| 10,742,313 | B1 * | 8/2020 | Favarolo | G06F 9/505 |
| 11,010,729 | B2 * | 5/2021 | Musiala, Jr. | G06Q 20/0655 |
| 11,663,610 | B2 * | 5/2023 | Buradagunta | G06Q 20/20 |
| | | | | 705/39 |
| 12,063,405 | B2 * | 8/2024 | Dorogusker | H04N 21/44213 |
| 2017/0140408 | A1 * | 5/2017 | Wuehler | G06Q 30/0207 |
| 2018/0253464 | A1 * | 9/2018 | Kohli | G06F 16/219 |
| 2019/0356641 | A1 * | 11/2019 | Isaacson | H04L 9/3231 |
| 2019/0392489 | A1 * | 12/2019 | Tietzen | G06Q 20/387 |
| 2020/0005284 | A1 * | 1/2020 | Vijayan | G06Q 20/065 |
| 2020/0134585 | A1 * | 4/2020 | Xu | H04L 9/3236 |
| 2021/0090166 | A1 * | 3/2021 | Bayne | G06Q 20/3825 |
| 2022/0198562 | A1 * | 6/2022 | Cella | G06Q 40/04 |
| 2022/0253834 | A1 * | 8/2022 | Vijayan | G06F 16/27 |
| 2022/0327225 | A1 * | 10/2022 | Lyren | G06F 21/125 |
| 2022/0337439 | A1 * | 10/2022 | McCoy | H04L 9/3247 |
| 2022/0337898 | A1 * | 10/2022 | Dorogusker | H04N 21/2187 |
| 2022/0374503 | A1 * | 11/2022 | Goldston | G06F 3/0481 |
| 2023/0057484 | A1 * | 2/2023 | Mott | G06Q 50/01 |
| 2023/0120534 | A1 * | 4/2023 | Jakobsson | G06Q 20/223 |
| | | | | 705/39 |
| 2023/0173395 | A1 * | 6/2023 | Cella | G06F 21/64 |
| | | | | 463/25 |
| 2023/0325814 | A1 * | 10/2023 | Vijayan | G06Q 20/3829 |
| | | | | 705/66 |
| 2024/0078577 | A1 * | 3/2024 | Tietzen | G06Q 30/0279 |

OTHER PUBLICATIONS

Murtuza Merchant. "NFTs: Bringing about the next level of funding social causes." (Apr. 19, 2022). Retrieved online Jun. 23, 2025. https://www.moneycontrol.com/news/business/cryptocurrency/nfts-bringing-about-the-next-level-of-funding-social-causes-8377161. html (Year: 2022).*

* cited by examiner

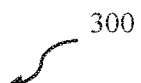

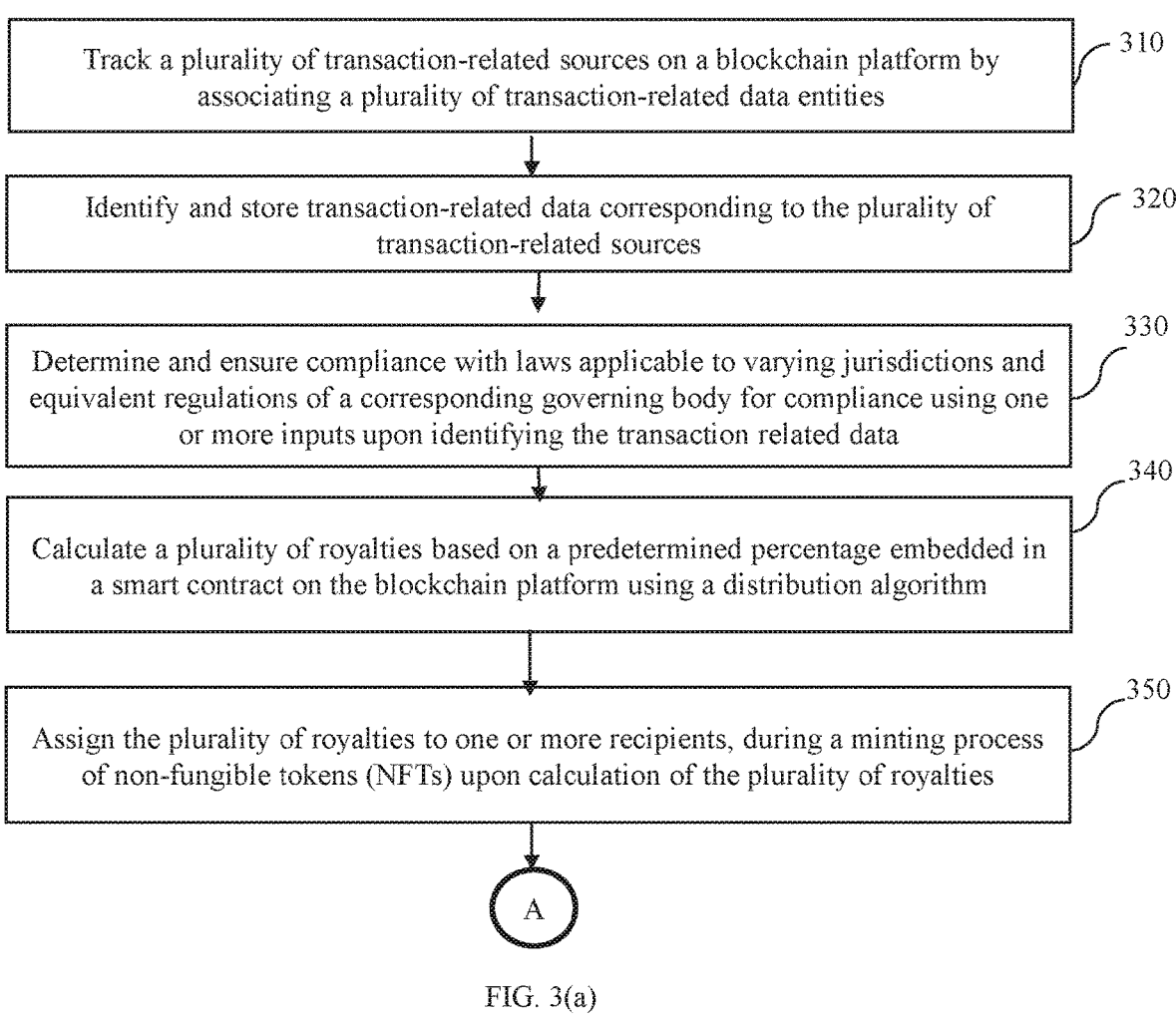

300

Track a plurality of transaction-related sources on a blockchain platform by associating a plurality of transaction-related data entities — 310

Identify and store transaction-related data corresponding to the plurality of transaction-related sources — 320

Determine and ensure compliance with laws applicable to varying jurisdictions and equivalent regulations of a corresponding governing body for compliance using one or more inputs upon identifying the transaction related data — 330

Calculate a plurality of royalties based on a predetermined percentage embedded in a smart contract on the blockchain platform using a distribution algorithm — 340

Assign the plurality of royalties to one or more recipients, during a minting process of non-fungible tokens (NFTs) upon calculation of the plurality of royalties — 350

SYSTEM AND METHOD TO MANAGE DIGITAL ASSETS

EARLIEST PRIORITY DATE

This Application claims priority from a Provisional patent application filed in the United States of America having Patent Application No. 63/423,461, filed on Nov. 7, 2022, and titled "SYSTEMS AND METHODS FOR DIGITAL ASSETS."

FIELD OF INVENTION

Embodiments of the present disclosure relates to digital assets or social media entity and more particularly to a system and method to manage digital assets.

BACKGROUND

Digital assets are broadly defined as any digital representation of value which is recorded on a cryptographically secured distributed ledger or any similar technology. A blockchain may be used as a public ledger or private ledger to store transactional information within a database. Transactions are executed within a blockchain database when it is determined that certain conditions are satisfied. The results of the transaction are stored in a database which is replicated (i.e., distributed) across multiple blockchain nodes. Because any individual or entity can provide information to a public blockchain, this information should be reviewed and confirmed. This review operation is known as consensus. Blockchain systems typically rely on a decentralized consensus which transfers authority and trust to a decentralized network and enables its nodes (i.e., blockchain peers) to continuously and sequentially record their transactions on a public "block", creating a unique "chain" referred to as a blockchain. Cryptography, via hash codes, is used with a blockchain to secure an authentication of a transaction source and removes the need for a central intermediary. Transactions on the blockchain between one source to another source (individual or company) has not been easy in the social media context. There are only a few scenarios in which transfer of an NFT, cryptocurrency, or other digital asset on the blockchain has been properly simplified.

Social networks have provided a unique environment for cutting edge technologies which are being developed to take advantage of the limitless potential that is provided by social networks. Transactions, compliance, and royalties have not been seamlessly integrated on the blockchain in the context of social networks. Instantly minting NFTs, providing copyright assignments, and generating various social media voice scores based on social media posts require improvements to the utilization of blockchain on the network. Transactions on the blockchain faces scalability issues. With the increasing number of users and transactions in a social network, the blockchain struggles to handle the load efficiently. Also, the transparent and decentralized nature of blockchain clashes with the privacy concerns in social networks. Balancing the need for transparency with the right to privacy is essential. Meeting regulatory requirements while maintaining the essence of blockchain is challenging with the current process. Similarly, determining the appropriate royalties for content shared on a social network is a challenge with currently existing system.

Therefore, there is a need for an improved system and method to manage digital assets to address the aforementioned issue(s).

BRIEF DESCRIPTION

In accordance with an embodiment of the present disclosure, a system to manage digital assets is provided. The system includes a blockchain-based compliance module is configured to track a plurality of transaction-related sources on a blockchain platform by associating a plurality of transaction-related data entities. The blockchain-based compliance module is also configured to identify and store transaction-related data corresponding to the plurality of transaction-related sources. The blockchain based compliance module is further configured to determine and ensure compliance with laws applicable to varying jurisdictions and equivalent regulations of a corresponding governing body for compliance using one or more inputs upon identifying the transaction related data. The system also includes a royalty distribution module operatively coupled with the blockchain-based compliance module. The royalty distribution module is configured to calculate a plurality of royalties based on a predetermined percentage embedded in a smart contract on the blockchain platform using a distribution algorithm. The royalty distribution module is also configured to assign the plurality of royalties to one or more recipients, during a minting process of non-fungible tokens (NFTs) upon calculation of the plurality of royalties. The system further includes a fundraising module operatively coupled with the royalty distribution module. The fundraising module is configured to assign a digital signature to at least one of brand sponsored posts and regular social media posts for fundraising purposes. The fundraising module is also configured to perform minting dynamic non-fungible tokens (NFTs) with corresponding fundraising labels to enable a user to buy, trade, and sell social entities to generate interest and donations. The system further includes a score generation module operatively coupled to the fundraising module. The score generation module is configured to calculate social media voice (SMV) scores for the social entities by analyzing a plurality of relevant variables. The score generation module is also configured to compare the social media voice (SMV) scores of the dynamic non-fungible tokens (NFTs) to determine recommended sale prices for the one or more recipients. The score generation module is further configured to assign the social media voice scores to the one or more recipients for sponsored social entities and dynamic non-fungible token (NFT) drops based on historical data and content analysis. The system further includes a management module operatively coupled to the score generation module. The management module is configured to create and distribute digital wills for the digital assets, by minting the digital Wills on the blockchain platforms, and modify the digital wills using dynamic non-fungible token (NFT) technology, thereby managing the digital assets.

In accordance with another embodiment of the present disclosure, a method to manage digital assets is provided. The method includes tracking, by a blockchain based compliance module, a plurality of transaction-related sources on a blockchain platform by associating a plurality of transaction-related data entities. The method also includes identifying and storing, by the blockchain based compliance module, transaction-related data corresponding to the plurality of transaction-related sources. The method further includes determining and ensuring, by the blockchain based compliance module, compliance with laws applicable to varying jurisdictions and equivalent regulations of a corresponding governing body for compliance using one or more inputs upon identifying the transaction related data. The method further includes calculating, by a royalty distribution module, a plurality of royalties based on a predetermined percentage embedded in a smart contract on the blockchain platform using a distribution algorithm. The method further includes assigning, by the royalty distribution module, the plurality of royalties to one or more recipients, during a minting process of non-fungible tokens (NFTs) upon calculation of the plurality of royalties. The method further includes assigning, by a fundraising module, a digital signature to at least one of brand sponsored posts and regular social media posts for fundraising purposes. The method further includes performing, by the fundraising module, minting dynamic non-fungible tokens (NFTs) with corresponding fundraising labels to enable a user to buy, trade, and sell social entities to generate interest and donations. The method further includes calculating, by a score generation module, social media voice (SMV) scores for the social entities by analyzing a plurality of relevant variables. The method further includes comparing, by the score generation module, the social media voice (SMV) scores of the dynamic non-fungible tokens (NFTs) to determine recommended sale prices for the one or more recipients. The method further includes assigning, by the score generation module, the social media voice scores to the one or more recipients for sponsored social entities and dynamic non-fungible token (NFT) drops based on historical data and content analysis. The method further includes creating and distributing, by a management module, digital wills for the digital assets, by minting the digital Wills on the blockchain platforms, and modify the digital wills using dynamic non-fungible token (NFT) technology, thereby managing the digital assets.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 3(*b*) is a flow chart representing the continued steps of method of FIG. 4(*a*) in accordance with an embodiment of the present disclosure.

Figure 1:
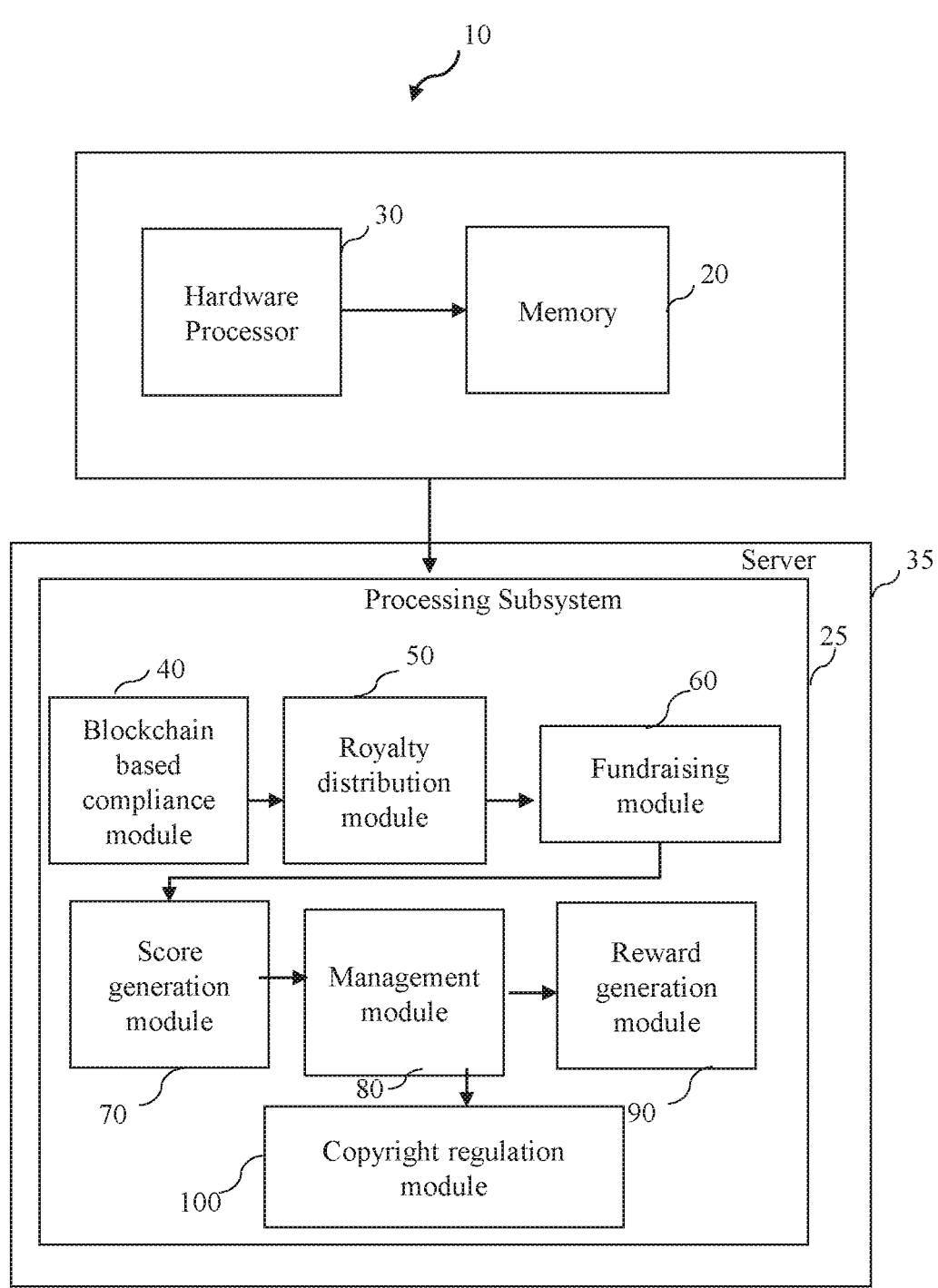
FIG. 1 is a block diagram of a system to manage digital assets in accordance with an embodiment of the present disclosure.

Further, those skilled in the art will appreciate that elements in the figures are illustrated for simplicity and may not have necessarily been drawn to scale. Furthermore, in teens of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiment of the present disclosure relates to a system and a method to manage digital assets. The system provides a streamlined and consistent approach to the blockchain environment surrounding social media platforms. As used herein "the blockchain environment includes a blockchain platform which is a shared digital ledger that allows users to record transactions and share information securely, tamper resistant. Similarly, as used herein, "social media platform refers to an online digital service or website that enables users to create, share, and interact with content and connect with other users". The main solutions disclosed herein relate to a new approach within social media applications or entities. As used herein, the term "application" (or "app") refers generally and without limitation to a unit of executable software that implements a certain functionality or theme, including as found in a social media environment. The themes of applications vary broadly across any number of disciplines and functions (such as on-demand content management, e-commerce transactions, posts, blockchain transactions, etc.), and an application may have more than one theme. The unit of executable software generally runs in a predetermined environment. For example, a processor apparatus may obtain and execute instructions from a non-transitory computer-readable storage medium where the instructions are compiled for the processor on a network receiving and sending data from a social media platform.

As used herein, the term "computer program" or "software" is meant to include any sequence or machine cognizable steps which perform a function. Such program may be rendered in virtually any programming language or environment including, for example and without 15 limitation, IDE, PaaS, C/C++, Java™, J2ME, Verilog, and the like.

The solution may include a new transaction method for digital assets, including minting NFTs on the fly, capturing a last will and testament within a digital asset, and fundraising. As used herein, "a non-fungible token is a unique digital identifier that is recorded on a blockchain and is used to certify ownership and authenticity. It cannot be copied, substituted, or subdivided. The ownership of an NFT is recorded in the blockchain and can be transferred by the owner, allowing NTTs to be sold and traded. The focus of this application will be on how new transaction methods on the blockchain found in social media environments help facilitate more robust compliance, copyright, and scoring of social media voice.

FIG. 1 is a block diagram representation of a system 10 to manage digital assets in accordance with an embodiment of the present disclosure. The system includes a processor 30 and a memory 20. The memory 20 is coupled to the processor 30, wherein the memory 20 comprises a set of program instructions in the form of processing subsystem 25, configured to be executed by the processor 30. As used herein, the hardware processor performs data processing, decision making, and all general computing tasks and coordinates tasks done by memory, disk storage, and other system components. The processing subsystem 25 is hosted on a sever 35. In one embodiment, the server 35 may include a cloud server. In another embodiment, the server 35 may include a local server. The processing subsystem 25 is configured to execute on a network (not shown in FIG. 1) to control bidirectional communications among a plurality of modules. In one embodiment, the network may include a wired network such as local area network (LAN). In another embodiment, the network may include a wireless network such as Wi-Fi, Bluetooth, Zigbee, near field communication (NEC), infra-red communication (RFID) or the like.

The processing subsystem 25 includes a blockchain-based compliance module 40 which is configured to track a plurality of transaction-related sources on a blockchain platform by associating a plurality of transaction-related data entities. The blockchain-based compliance module 40 is also configured to identify and store transaction-related data corresponding to the plurality of transaction-related sources. The blockchain based compliance module 40 is further configured to determine and ensure compliance with laws applicable to varying jurisdictions and equivalent regulations of a corresponding governing body for compliance using one or more inputs upon identifying the transaction related data. In one embodiment, transaction-related data are data relating to NFTs, cryptocurrency, and the like that can be identified together with other information that is in or is likely to come into the possession of the entity on a given social media platform. In some embodiments, social media compliance may ensure marketing content across social media channels follows the rules and regulations set by the relevant government or authority. In such embodiment, compliance may include industry-specific regulations, such as those for financial services, as well as regulations specific to consumer protection. Businesses and marketers using social media must follow regulations and abide by compliance obligations to avoid penalties and other potential fallout.

In one embodiment, the algorithm and database of compliance regulations may populate the proper output response depending on the network, blockchain, social media platform, or another environment. In one scenario, before a post is published, the algorithm uses the database to cross reference regulations from the location of the post to insert the appropriate hashtag in the description and/or include additional data on the blockchain to comply with the regulations.

For example, popular social media platform such as Instagram® inform influencers to use the branded content tag to identify the relationship. However, if the influencer doesn't use the tag, there is nothing Instagram can do to help the influencer. This method and system for compliance rectifies this issue by automatically including the necessary description and data for compliance. If a brand contacted an influencer through the system to sponsor a post, the post will automatically have the #ad or country equivalent in the description so the brand and influencer do not have to risk it. Both brands and influencers want an easy way to ensure compliance because of the fines for violating these rules. This solves the problem technologically by identifying the location of the user and displaying the #ad or country equivalent, making the post compliant.

In one embodiment, the regulations may include the UDAAP (Unfair, Deceptive or Abusive Acts and Practices), the Consumer Financial Protection Bureau (CFPB), the Federal Trade Commission (FTC), the Financial Industry Regulatory Authority (FINRA), and other regulatory bodies. Advertising laws play a huge role in social media marketing compliance, such as regulations that require ads to be truthful and not misleading. The FTC's Endorsement Guides provides guidance on how to properly disclose material connections between advertisers and endorsers.

In one embodiment, "Payola" compliance on the blockchain using NFT using inputs such as, but not limited to, location or other social media post attributes to determine the FTC equivalent of a given country or other governing body to find the appropriate compliance regulations. After locating the proper regulations for compliance, the post or transaction may be modified to comply. As shown, location is used to reference laws before minting. In one example, if a security is not promoted then the post is minted along with a description and data to comply with the relevant law. However, if a security is minted, then additional information is required, including the amount paid, scope of agreement, relationship to the brand, or the like.

Furthermore, the processing subsystem 25 includes a royalty distribution module 50 operatively coupled with the blockchain-based compliance module 40. The royalty distribution module 50 is configured to calculate a plurality of royalties based on a predetermined percentage embedded in a smart contract on the blockchain platform using a distribution algorithm. The royalty distribution module 50 is also configured to assign the plurality of royalties to one or more recipients, during a minting process of non-fungible tokens (NTTs) upon calculation of the plurality of royalties. In one embodiment, the royalty percentage may be set on total sale or fixed amount, the recipients are set, the percentage of the royalty share for each recipient is allocated, a secondary NTT sale price and earn ongoing royalties may be used, then the assignment of royalties to user wallets may occur, including possible royalties assigned to charity accounts, which may also include a selection of destination of royalty payments.

In one embodiment, the royalty distribution module 50 may take secondary NFT sale price multiplied by the royalty percentage and distribute revenue among recipients per percentage share. An email, SMS, or communication node verification of acceptance of the royalty may occur and if royalties are accepted by all parties, then transaction is minted or if not, they are removed and primary author of the NFT will be notified. If no notification is sent, then the user will automatically receive royalties from sale or future sales. Database of contact address of wallet address will be made available to allow author of NFT to select or add or remove from address book. Royalties are set during the minting process or can be decided by email, contract or notified before minting process. Digital proof will be held in asset data bank. Authorization can be done or accepted in smart contract, fax, email, paper and added as part of the verification that other wallet holders wish to get royalties. The result may include output of royalty share for each recipient and a distribution of royalties to recipients upon secondary sale. A receipt of tax-deductible amount if fundraising/donating may be dispersed.

In some embodiments, the user may be assigned an identifier. Such identifier may access social media accounts associated with that influencer, blockchains available to particular user in the given geography, payment methods that are allowed based by geography, compliance guidelines like age, license number, or the like. Further, the post from the social media platforms, and/or the ability to generate a post or upload an image, gif, video, audio, URL to be minted as an NFT. In some scenarios, at the time of the "minting process" the price of the NTT will be set. This price may be assigned, given, auctioned, bided or calculated based upon the user's preference. The eventual price becomes the "sale price" which allows the user then has the option to share with other based on percentages, amounts, and assign them to wallet account holders.

In a particular embodiment, users may have the ability to share the sale price with others across social media platforms and blockchains. Requirements will be the wallet address, ACH, bank details, PayPal®, Venmo®, wire details or some kind of payment instructions. Once percentage is assigned to account holders or multiple holders a verification email/SMS or communication may be sent to all users or just between the author of the NFT and the other individual receiving the shares of the sale. For example, a sports figure, might have an agent and arrangement where all promotional sales must be given a percentage or commission. Distribution of the funds at the time of the sale rather than doing it later creates a more efficient methodology. Once the transaction is minted or generated the item can be made for sale by web, script, wallet, or any other format. The user id database talks to the minting process module. The royalty generation module 50 pulls databases based on the identifier. The royalty generation module 50 may generate the NFT and take datapoints of or including payment methodology such as royalties. Royalties may be calculated by the author of the identifier or may be solicited by email or SMS communication or within the system. Once all the parties agree or the author decides by themselves. Such percentages are embedded in the smart contract on the block chain the user has chosen along with the payment details and the amount. If the NFT reaches a point of sale the amounts may be embedded into the contract and trigger payment or wallet ids to share the portion of the sale. This may be calculated once the point of sale is made, or another system based on the platform marketplace the user is using blockchain.

After the algorithm is ran and once the calculation is generated, they will be assigned in the database and blockchain as well as in the smart contract. The amount is then allocated at time of the sale in crypto or by third party sites that allow NFT transactions.

Moreover, there are shared royalties in other contexts, such as shared royalties on music NTTs, the methods and systems for shared royalties on social media NTTs. Currently, if you want to distribute multiple royalties you have to receive the payment, then manually send it to each royalty recipient, this feature may make it, so the royalties are distributed automatically upon payment. Royalty percentages are embedded in the smart contract on the block chain the user has chosen along with the payment details and the amount. If the NTT reaches a point of sale the amounts may be embedded into the contract and trigger payment or wallet ids to share the portion of the sale. This may be calculated once the point of sale is made within, or another system based on the platform marketplace the user is using.

Moreover, the processing subsystem 25 includes a fundraising module 60 operatively coupled with the royalty distribution module 50. The fundraising module 60 is configured to assign a digital signature to at least one of brand sponsored posts and regular social media posts for fundraising purposes. The fundraising module 60 is also configured to perform minting non-dynamic or dynamic non-fungible tokens (NFTs) with corresponding fundraising labels to enable a user to buy, trade, and sell social entities to generate interest and donations. As used herein, dynamic NFTs (dNFT), also known as programmable or interactive NFTs, are a type of non-fungible token (NFT) that can change or respond to various inputs, conditions, or external factors, allowing for interactivity and evolution over time. The dynamic NFT (dNFT) is a Non-Fungible Token (NTT) with encoded smart contract logic that enables it to automatically change its metadata based on external conditions. The Non-Fungible Token (NFT) is a cryptographically secured token existing on the blockchain that represents ownership of something unique. In one embodiment, the fundraising module 60 may allow a social post and immediately allow it to have the digital signature of the identified and assign the post to raise funds. In such an embodiment, the sale price may be one time or scalable based upon engagement. As more engagement likes, shares or the like take place the price may increase making the NFT more valuable and thus the donation in-turn will likely have a greater value.

In some embodiments, users may engage in the social media post and help generate value for the fundraising purposes or buy, trade, sell the post at any time. The post is minted as a NFT so that the values of the fundraising label may be inserted and also trigger necessary tax disclosure for government entities. The nature of the post, the organization you are raising funds for the amount, and the cause or campaign behind the post. Multiple post or content could be generated and sold one time or editions as tactics to generate interest and give more than one person to donate buy purchased the NFT. The NFT will generate and or server also a transaction on record on the block chain and the public ledger so others may know that the transaction proceeds and mount have been assigned to the charity, organization or NGO. The amount may be displayed and the likes, replies, and shares numerical value may be displayed dynamically on the post. Users engaging with the NFT social media post may have the option to earn points for their choice of interaction by sharing it to other social media platforms or emailing or downloading it. A copy of the NFT will be given to the buyer and be able to store in a digital wallet or email receipt of the transaction. Fundraising may track the amount raised, the time period, and assign numbers to the digital NFTSs. Each NFT may help organizations raise funds at the same time royalties could be shared with the content creator and the organization during the minting process as referred. Donations can be given at the time of the sale of a NFT to a charity so that if NFT is not fundraising, but the creator wishes to give it to charity. A database of charities based on location will be shared and the user can donate a portion or all of the NFT to the organization by email or directly to their wallet.

In one embodiment, the secondary NFT sale price is multiplied by the royalty percentage and revenue is distributed among recipients per percentage share. An email/SMS or communication node verification of acceptance of the royalty may be implemented. If royalties are accepted by all parties, then transaction is minted or if not, they are removed and primary author of the NFT will be notified. If no notification is sent, then the user will automatically receive royalties from sale or future sales. Database of contact address of wallet address will be made available to allow author of NFT to select or add or remove from address book. Royalties are set during the minting process or can be decided by email, contract or notified before minting process. Digital proof will be held in asset data bank. Authorization can be done or accepted in smart contract, fax, email, paper and added as part of the verification that other wallet holders wish to get royalties and al low distribution of royalties to recipients upon secondary sale.

Similarly, a database, blockchain, NFT, crypto wallet, or other application may interface with the col lection. When creating a collection, the user sets the royalty percentage they want to assign to the charity. Upon the secondary sale of the NFT, the royalties will be distributed to recipients. Fundraising is similar to brand sponsored post but includes tax disclosures, donations are different from existing solutions because currently, you have to receive the revenue from the NFT sale, then donate to the charity, this feature allows you to set the donation royalty percentage and not have to think about it. This creates a trustless system where the payment is automatically sent to the charity rather than hoping the influencer will send the donation. Other benefits allow someone considering buying the NFT to know a percentage of the sale will go to the charity and may be more willing to make the purchase.

Considering an example where, the search for classified ads is performed. Every person has an identity, and that identity is assigned based on physical and non-physical features. The ability to match those features to social media accounts based on non-physical features does not exist. A photo can identify someone but can a twitter account cannot identify a person or the reverse. An avatar, profile picture can identify but also a game skin can do the same with the username. The ability to search and find value on each of these identifiers is based on the "social networth". For example, how much content have they created. How games have they won. How many points have they accumulated how many hours they have spent. The ability to assign value to these and other features of behaviour can assign value to the users and the digital assets they wish to sell.

In the continued example, the outside fame of a sport celebrity has a value. But fame of a gamer under an ID also has equal if not great value in the metaverse or ecosystem or social network. The ability to identify who someone is in the real world, the physical world, and some in the virtual world or metaverse and value the worth or value of their identity. This can be done by finding the root variables of identification by KYC. Also, this can be done by matching or collecting social media users. This cannot be done just based on username alone as the universal name is not assigned.

In one case, the identifier becomes a wrapper of all the social media accounts. Aggregating the social media accounts into an identifier and the matching them to passport, ID, and license number, Additionally, biometrics, facial pictures, eye and breath can also determine identity based on bodily fluids and features. Then the government or geography identity based on items that have already been prove identity assurance and verification. Like driver license and passport, birth certificates. Once the data is collected from the virtual world and then matched to the physical world the identifier is given an identity. Symbolized by a check mark or some symbol. Then the identifier can be displayed or shown. All this can be recorded on the blockchain on a public ledger to ensure transparency and ensure that information is properly encrypted and provided with a verification certificate. A hash or identifier is also assigned recording date or time and allow information to be update withing multiple hashes.

Additionally, once this completed on the block chain the identifier will be able to place worth items like income, game results, social media followers, and other stats metrics to give themselves value. Content volume and frequency can also add value by measuring the sentiment, tone, and word count and use of keywords to see the value of the identifier. Further, the use of # or hashtags will see what items have been talked about or associated with the user. Including mentions who has been associated with social media identifier and within their network. The value of the NTT will be calculated by the sum of these items and divided by the frequency of their activities giving them value. However, if there are not actively engage the value will diminish over time. The ability for followers to engage with the identifiers NFT will allow it to amplify its impact.

In addition, the processing subsystem 25 further includes a score generation module 70 operatively coupled to the fundraising module 60. The score generation module 70 is configured to calculate social media voice (SMV) scores for the social entities by analyzing a plurality of relevant variables. The score generation module 70 is also configured to compare the social media voice (SMV) scores of the dynamic non-fungible tokens (NTTs) to determine recommended sale prices for the one or more recipients. The score generation module 70 is further configured to assign the social media voice scores to the one or more recipients for sponsored social entities and dynamic non-fungible token (NFT) drops based on historical data and content analysis.

More specifically, social media voice score is measuring the voice of the influencers post. Every post has a content which can be defined as text, images, gifs, URLs, emojis, hashtag (#), @ lingo, abbreviations, and even numbers. Social Media voice calculates each of these variables and measures it against that of the engagement of the NFT. If the NTT is already posted on social media platform then every like, share, comment, will be measured assigning a value. This value then helps serve as a dependent variable to measure what content the post has and what it is missing. It then looks at the aggregated mean and takes in account any deviations due to frequency or volatility that might occur. For example, the score uses followers as a control variable so that it will not skew the results mentions, hashtags, URLs, emojis, emoticons and/or lingo; and calculating a Social Media Score that is: Educational; Inspirational; Interactive; Connecting; Promotional; Newsworthy; and Entertaining. The score collects content based on the following criteria: Listening (Research); Content Marketing (Content Creation and Curation); Engagement (Community Management); Promotion (Advertising); Measurement (Metrics, KPIs, and Analytics). Similar to the SMV score, the intensity of an interactive emoticon based on intensity of emotion (or another identifier) from the follower or user may be employed.

The SMV score may depend on the elements of the social media post and the surrounding context. In one embodiment, comparative calculation to measure social media influence (SMV Score) include independent variables such as text. In such an embodiment, the text may include word count, the number of words, the keywords, the relationship of words, with associated tone, sentiment, @lingo, abbreviations and capitalization of letters and use of it in more than one word, for example RT (retweet) or PLS (please). Other independent variables are Images/GIFs (black and white, colorful image, rotating images, images with gif animation); URLS (short URL, social media URI, URL to main website, URL to press or authority site, etc.); Emojis (emojis in color emojis noting color, emoticons (:)); Hashtag (#): (keyword association); Numbers (phone numbers, confirmation numbers, validation 10 numbers security numbers); and @ Mentions (that of key locations, official accounts, and verified mentions).

In some embodiments, the dependent variables (Metadata) may include likes, shares, and comments. Feature actions use AI to calculate each of these independent variables and measure it against that of the dependent variables of the NFT with an output and associated aggregated mean. Additional components and connections may be derived from machine learning, AI, proprietary algorithm. The method and manner of operations take the inputs, run them through the algorithm and outputs SMV score, they also consider deviations due to volatility or frequency. Followers are used as a control variable to not skew results and allow for the assignment of value to a NFT in a social media environment.

Furthermore, the SMV score based on information from databases includes an internal database and databases of social media platforms. The NFTs will have several abilities to compare SMV score to other similar post/NFTs in the internal database allowing for a recommended sale price of the NFT. In one embodiment, the post is scanned using Machine Learning/AI, the algorithm, databases, and the SMV score to output recommended sale price for NFT. This method may allow for the assignment of value to influencers for designed brands. In such an embodiment, the SMV score may be compared to past posts with influencers in similar industries with similar reach. The score generation module may recommend price that the brand should offer the influencer to make a sponsored post. In one embodiment, the SMV takes the score and output recommend price the brand should offer the influencer to make a sponsored post. In another embodiment, the score generation module may al low for assigning value to attending NFT drop based on the databases and the associated influencer NTT being released. This method finds previous NFT drops and how much attendance cost was to recommend a price for attending a given NFT drop. The SMV score of the NTTs that will be dropped and output recommended price the influencer should charge fans to attend the drop may include a recommended price for paid membership based on social influence. Perks may be associated with the NFT such as a meet and greet or additional NTT drops, each with frequency, success, and quality considerations. The input influencer SMV Score and offered perks may be used to recommend a price for paid membership.

In one embodiment, the processing subsystem 25 may include a reward generation module 80. The reward generation module 80 is configured to automatically mint non-fungible tokens (NFTs) for followers of a social media account when a follower follows an influencer, based on a designated follower collection. In such an embodiment, the reward generation module 80 is configured to distribute non-fungible tokens (NFTs) a wallet of the followers of the social media account wallets upon performing one or more activities comprising following, promoting, engagement and expanding social reach. In some embodiments, values are assigned to influencers for brands. Because brands have a hard time determining an amount to pay an influencer for sponsored posts since it varies from influencer to influencer and they must negotiate the price before the post is made and most influencers prefer a flat fee rather than being paid based on performance, the SMV score allows for a more reliable evaluation. In another embodiment, values are assigned to NFT drops. Because people set the number of NFTs that will be release on drop based on how many they can sell with the goal of selling out. But they still want to reward their most loyal supporters by allowing them to guaranteed mint if they want to, thus, the set a price to attend the drop for non-subscribers may still allow the project to sell out.

Moreover, a recommend price for paid membership based on social influence solves the issue that influencers do not know how to price higher-tier subscriptions and it varies based on what each influencer has to offer. In one embodiment, the recommend a price for these subscriptions that reflects the influencer's social influence and how much they offer with the subscription is derived. In such an embodiment, the subscriptions may include different membership tier rewards, such as VIP (meet and greet), crypto tax service, Superfans with benefits like ad-free experience, access to NFT drops, access to discounts, access to Merch drops, access to promotions, and regular followers with standard NFTs and other normal benefits found on social media platforms.

In one exemplary embodiment, transactions and pieces of data in the exchange for post are recorded on the blockchain and public ledger for both the brand and influencer. So that any transaction that is monetary, gift, or exchange of words "favors" can be authenticated and document for internal or external purposes. In one embodiment, the reward generation module may be configured to provide "Favor me", "Reward me" and "pay me" feature, wherein favour me is the ability to do a favor on social media and record the transaction between one or multiple social media account users. Similarly, reward me is the ability to gift by ecommerce or product the influencer for doing something for you. Also, pay me is the ability to receive fiat or crypto for doing a transaction of a social media post.

In such embodiment, currency for reward may be distributed through merchant transaction, credit card, ACM, PayPal, Venmo, QR code, lightning network or the like. This is considered as a sponsored ad post. The post could be in the form of a reel, post, video, gif, audio, or any feature on multiple of social media platforms. Each of these features are based on the identifier account that can be found on a web-based page and the bank account and details of them will be queried by the identifiers. On their characteristics, stats, followers total that will be validated by third parties and not directly inputted by them.

Furthermore, the brand or advertiser can fill in a SaaS from with the prescribed fields. Once that information is populating the data base will query the laws and regulations and provide documentation of the request on the blockchain.

The influencer has the "offer" but the offer must be accepted or denied. If accepted the influencer will be able to accept the compensation, a payment, a reward, or a favor. Once that is accepted the social media account holder influencer will be embedded on the blockchain that he/she has accepted the terms of the compensation. Time, mentions #, and other variables could be added to the order as set requirement. The advertiser transaction will be held in a database until the post has been made and can be validated by the social media platform, third party, or even human via a virtual terminal. The results will be shared back to the brand via this terminal in a display by dashboard and by SMS, email, or the like. The order is fulfilled based on dates that are assigned. After the dates have been assigned the funds minus the fee will be sent to the influencer and the post will be minted as post that post will take the form of an NFT. An NFT will be sent to the brand as part of the order or will have the opportunity to purchase it. If not the NFT will be sold on a marketplace or kept private collection for the author to be sold in another day.

Transactions may have a separate hash on the blockchain, and the data can feed into a government or third-party API database or accessible. Once the transaction is complete and the funds available, they will be transferred to the influencer if the influencer does not fulfill the account, it can affect the rank on the platform and the funds are returned at no expense back to the account holder. In one embodiment, Favor Me uses payment(points), favor details, and favor completion (usually a post is minted). Inputs are taken and checked before sending points to influencer either to a points wallet or via a smart contract where it is possible that points escrow until both sides meet requirements. The favor details that include payment with points recognizes when favor is completed then distributes points to the influencer on the blockchain. In such embodiment, the payment type may include an on-rail payment and an off-rail payment. In one-rail payment method, no charges being charged unless there is a natural purchase is occurred. In off-rail payment method, the payment may be converted into points, tokens, credits or the like.

In one version, an NFT is "minted on the fly" for followers when they follow an influencer. The NFT comes from the influencer's "follower" NFT collection and is sent to the user following influencer wallet address. The NTT may be random or determined on the number of followers or newness of the follower. NFTs are not limited to a "follower collection" and may be preset by the social media platform. The algorithm, NTT wallet (follower/influencer), and appropriate blockchain interact to complete the transaction as soon as the follower "clicks"/"taps" follow When someone follows an influencer, they receive an NTT from that influencer's "follower collection" that goes to their NTT wallet. This is different from existing NFT distributions because if influencers want to reward their followers, they must mint an NTT and transfer the NTT to the follower's wallet. Here, it is automatic and will allow influencers to gain more followers/expand their social reach.

Additionally, the processing subsystem 25 further includes a management module 90 operatively coupled to the score generation module 80. The management module 90 is configured to create and distribute digital wills for the digital assets, by minting the digital Wills on the blockchain platforms, and modify the digital wills using dynamic non-fungible token (NFT) technology, thereby managing the digital assets. More specifically, When the NFT is created, the user submits the Will contents in a form necessary to determine the distribution which takes the form and makes it into a smart contract. After the form is filled out by the user a mechanism turns the form into a Will then the Will is minted on the blockchain of user's choice. Further, the user has the option to modify the will later using dynamic NFT technology. Within the hashtag.bio platform, users can interact with brands, connect their social media accounts, and list the content on these accounts as NFT and offer them for sale on the hashtag.bio application. In a specific embodiment, the management module is configured to determine intensity of a like function on a social media platform via at least one of an emoji, an employee fan, and a volunteer fan. In such embodiment, intensity is measured through a scaling system to measure the intensity of hashtag by counting the number of hashtags used, mentions and review based on satisfaction, credibility, and gratitude. In one embodiment, the social media worth of a person is measured by the engagement factor of like, shares, mentions, hashtags and comments.

In one embodiment, a mobile application to be prepared, which aims that users will interact with brands, users will convert their social media content into NFTs and offer them for sale, so that NFTs can be purchased by users. It is aimed to create a wallet fiction for users to earn points and convert these points into assets (crypto, gift cards, or the like) to be determined. According to these functions, it is aimed to design the application in accordance with the target audiences and at the same time to have a usage, display and navigation structure where users can easily access the information they are looking for. A Will that is minted on a blockchain takes the place or supplements a traditional Will to ensure digital assets can be retrieved and distributed to the proper beneficiaries. Further, beneficiaries don't have to worry about looking for logins when the person dies.

In one embodiment, processing subsystem 25 may include a copyright regulation module 100 configured to generate copyright terms for the social media entities included in the smart contracts, simplifying agreements between the one or more recipients. Specifically, copyright terms are established; for example, one brand may get 100% ownership, there may be split ownership (specify percent for each), or each influencer gets 100% ownership of their NFT or subset of NFTs. The copyright terms are inputs that are included in a smart contract. This improves upon existing solutions where there is a separate contract specifying the percentage ownership each party receives. Here, the social media post includes the copyright percentages in a smart contract. Further, this method simplifies for the brand to contract an influencer because the influencer gets all the documents they need to agree to at once. Simply put, the post takes the desired copyright percentage and puts it into a smart contract and mints it on the blockchain preventing the need for separate contracts outside of the digital asset.

Figure 2:
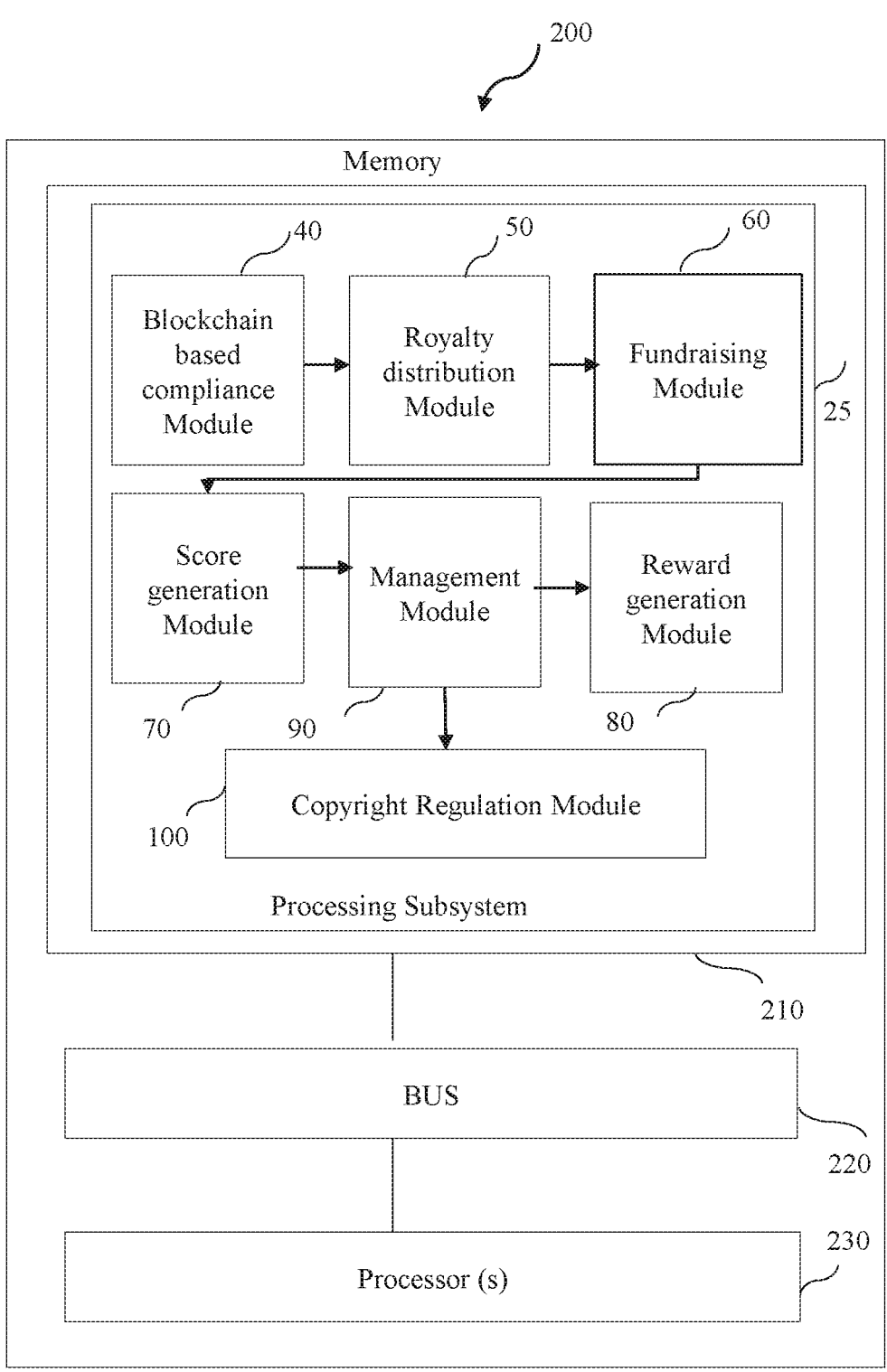
FIG. 2 is a block diagram of a computer or a server in accordance with an embodiment of the present disclosure.

FIG. 2 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 includes a processing subsystem 25 of FIG. 1. The processing subsystem 25 further has following modules: a blockchain based compliance module 40, a royalty distribution module 50, a fundraising module 60, a score generation module 70, a management module 90, a reward generation module 80 and a copyright regulation module 100.

The blockchain-based compliance module 40 is configured to track a plurality of transaction-related sources on a blockchain platform by associating a plurality of transaction-related data entities. The blockchain-based compliance module 40 is also configured to identify and store transaction-related data corresponding to the plurality of transaction-related sources. The blockchain based compliance module 40 is further configured to determine and ensure compliance with laws applicable to varying jurisdictions and equivalent regulations of a corresponding governing body for compliance using one or more inputs upon identifying the transaction related data. The system also includes a royalty distribution module 50 operatively coupled with the blockchain-based compliance module 40. The royalty distribution module 50 is configured to calculate a plurality of royalties based on a predetermined percentage embedded in a smart contract on the blockchain platform using a distribution algorithm. The royalty distribution module 50 is also configured to assign the plurality of royalties to one or more recipients, during a minting process of non-fungible tokens (NFTs) upon calculation of the plurality of royalties. The system further includes a fundraising module 60 operatively coupled with the royalty distribution module 50. The fundraising module 60 is configured to assign a digital signature to at least one of brand sponsored posts and regular social media posts for fundraising purposes. The fundraising module 60 is also configured to perform minting dynamic non-fungible tokens (NFTs) with corresponding fundraising labels to enable a user to buy, trade, and sell social entities to generate interest and donations. The system further includes a score generation module 70 operatively coupled to the fundraising module. The score generation module 70 is configured to calculate social media voice (SMV) scores for the social entities by analyzing a plurality of relevant variables. The score generation module 70 is also configured to compare the social media voice (SMV) scores of the dynamic non-fungible tokens (NFTs) to determine recommended sale prices for the one or more recipients. The score generation module 70 is further configured to assign the social media voice scores to the one or more recipients for sponsored social entities and dynamic non-fungible token (NFT) drops based on historical data and content analysis. The system further includes a management module 90 operatively coupled to the score generation module 70. The management module 90 is configured to create and distribute digital wills for the digital assets, by minting the digital Wills on the blockchain platforms, and modify the digital wills using dynamic non-fungible token (NFT) technology, thereby managing the digital assets.

The system includes a reward generation module 80 operatively coupled with the management module 90. The reward generation module 80 is configured to automatically mint non-fungible tokens (NFTs) for followers of a social media account when a follower follows an influencer, based on a designated follower collection. The reward generation module 80 is configured to distribute non-fungible tokens (NFTs) a wallet of the followers of the social media account wallets upon performing one or more activities comprising following, promoting, engagement and expanding social reach. The system includes a copyright regulation module 100 configured to generate copyright terms for the social media entities included in the smart contracts, simplifying agreements between the one or more recipients.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 3B:
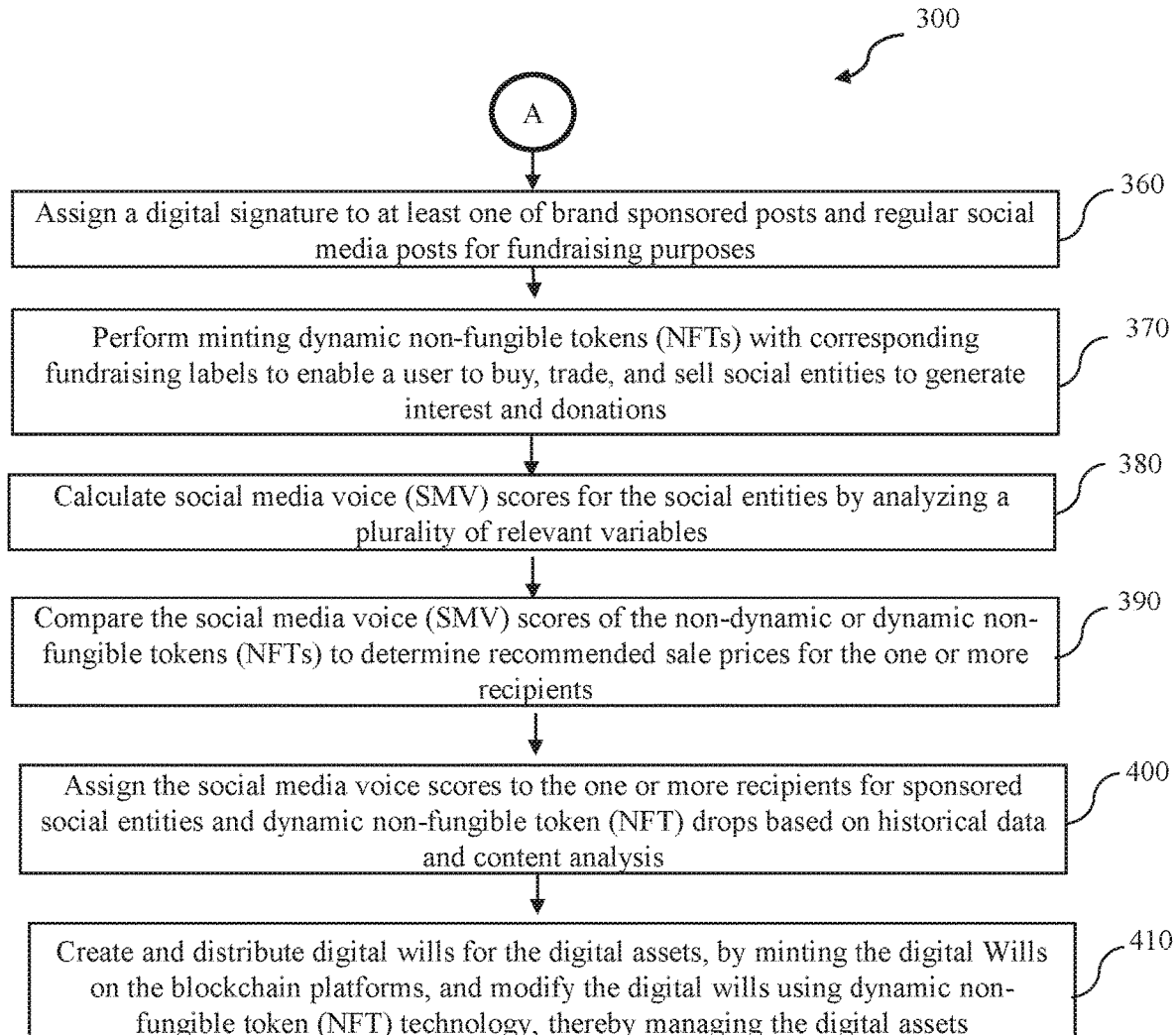
FIG. 3(*a*) is a flow chart representing the steps involved in a method to manage digital assets of FIG. 1 in accordance with an embodiment of the present disclosure.

FIG. 3(a) is a flow chart representing the steps involved in a method 300 to manage digital assets in accordance with an embodiment of the present disclosure. FIG. 3(b) is a flow chart representing the continued steps of method to manage digital assets of FIG. 3(a) in accordance with an embodiment of the present disclosure. The method 300 includes tracking, by a blockchain based compliance module, a plurality of transaction-related sources on a blockchain platform by associating a plurality of transaction-related data entities in step 310. In one embodiment, associating a plurality of transaction-related data entities may include the plurality of transaction related data entities comprises the non-fungible tokens (NFTs), and cryptocurrency. The method 300 also includes identifying and storing, by the blockchain based compliance module, transaction-related data corresponding to the plurality of transaction-related sources in step 320. The method 300 further includes determining and ensuring, by the blockchain based compliance module, compliance with laws applicable to varying jurisdictions and equivalent regulations of a corresponding governing body for compliance using one or more inputs upon identifying the transaction related data in step 330.

In some embodiments, determining and ensuring compliance using the one or more inputs may include at least one of a location and one or more social median post attributes. In one embodiment, the method may include modifying, by the blockchain based compliance module, one or more transactions on the blockchain platform to comply with identified regulations comprising inserting corresponding hashtags, descriptions, or additional data.

The method 300 further includes calculating, by a royalty distribution module, a plurality of royalties based on a predetermined percentage embedded in a smart contract on the blockchain platform using a distribution algorithm in step 340. The method 300 further includes assigning, by the royalty distribution module, the plurality of royalties to one or more recipients, during a minting process of non-fungible tokens (NFTs) upon calculation of the plurality of royalties in step 350. In an exemplary embodiment, assigning the plurality of royalties to one or more recipients may include at least one of a content creator and a charitable organization. In another embodiment, the method may include triggering, by the royalty distribution module, payments or wallet IDs to distribute assigned royalties upon secondary sale of the non-fungible tokens (NFT).

The method 300 further includes assigning, by a fundraising module, a digital signature to at least one of brand sponsored posts and regular social media posts for fundraising purposes in step 360. The method 300 further includes performing, by the fundraising module, minting non-fungible tokens (NFTs) with corresponding fundraising labels to enable a user to buy, trade, and sell social entities to generate interest and donations in step 370. In one embodiment, the method may include dynamically adjusting, by the fundraising module, the sale price of NFTs based on user engagement, such as likes, shares, and other interactions. In such an embodiment, the fundraising module is configured to generate a transaction record on the blockchain platform and public ledger for transparency in fundraising activities.

Moreover, the method 300 further includes calculating, by a score generation module, social media voice (SMV) scores for the social entities by analyzing a plurality of relevant variables in step 380. In one embodiment, analyzing the plurality of relevant variable may include at least one of text, images, uniform resource locator (URLs), emojis and hashtags. The method 300 further includes comparing, by the score generation module, the social media voice (SMV) scores of the dynamic non-fungible tokens (NFTs) to determine recommended sale prices for the one or more recipients in step 390. The method 300 further includes assigning, by the score generation module, the social media voice scores to the one or more recipients for sponsored social entities and dynamic non-fungible toke n (NFT) drops based on historical data and content analysis in step 400.

In addition, the method 300 further includes creating and distributing, by a management module, digital wills for the digital assets, by minting the digital Wills on the blockchain platforms, and modify the digital wills using dynamic non-fungible token (NFT) technology, thereby managing the digital assets in step 410. In one embodiment, the method may include generating, by the management module, a fours to receive will content and convert the form into a smart contract.

In one embodiment, the method 300 may include automatically minting, by a reward generation module, non-fungible tokens (NFTs) for followers of a social media account when a follower follows an influencer, based on a designated follower collection. In such an embodiment, distributing, by the reward generation module, non-fungible tokens (NFTs) a wallet of the followers of the social media account wallets upon performing one or more activities comprising following, promoting, engagement and expanding social reach. In some embodiments, the method 300 may include generating, by a copyright regulation module, copyright terms for the social media entities included in the smart contracts, simplifying agreements between the one or more recipients.

Various embodiments of the present disclosure provide a system and method to manage the digital assets described above enable various advantages. The social media voice score benefits are more robust than previous methods that only look to historical data and past examples, not based on the actual content of the post/influencer/drop. The SMV score gives influencers/brands/followers a way to value what they are buying rather than estimating a value based on similar examples. This solves the problem technologically by gathering all the available, relevant data and using it to assign a value rather than relying on a human who can only consider a certain amount of information.

Subsequently, comparative calculation to measure social media influence solves the problem caused by people not knowing how to effectively create a social media post that will drive engagement. The described methods and systems solve the engagement issue by using the social media voice score that analyses text, images, links, emojis, hashtags, numbers, and @ mentions can be used to predict engagement on a social media post. The amount of engagement the post will generate is translated into an easy-to-comprehend value, the SMV score that is assigned to the digital asset.

Furthermore, many people are buying and selling NFTs for the purpose of making money and since there is currently no concrete way of valuing NFTs, it is difficult for someone just entering the ecosystem to know what to buy and for what price. This SMV score allows for pricing NFTs using historical data and scanning the post looking at text, images, links, emojis, hashtags, numbers, and @ mentions to assign a value to the Social NFT. Users can be more comfortable purchasing an NFT when they know how its metrics compare to other NFTs. This solves the problem by having the system automatically send the follower a NFT from the influencers designated "follower collection" or a completely random pool of NFTs when the user follows.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system to manage digital assets comprising:
   a processor; and
   a memory coupled to the processor, wherein the memory comprises a set of program instructions in the form of processing subsystem, configured to be executed by the processor, wherein the processing subsystem is hosted on a server, wherein the processing subsystem comprises a plurality of modules, wherein the plurality of modules comprises:
   a blockchain-based compliance module is configured to:
      track a plurality of transaction-related sources on a blockchain platform by associating a plurality of transaction-related data entities;
      identify and store transaction-related data corresponding to the plurality of transaction-related sources;
      determine and ensure compliance with laws applicable to varying jurisdictions and equivalent regulations of a corresponding governing body for compliance using one or more inputs upon identifying the transaction related data; and
      modify one or more transactions on the blockchain platform to comply with identified regulations comprising inserting corresponding hashtags, descriptions, or additional data;
   a royalty distribution module operatively coupled with the blockchain-based compliance module, wherein the royalty distribution module is configured to:
      calculate a plurality of royalties based on a predetermined percentage embedded in a smart contract on the blockchain platform using a distribution algorithm;

assign the plurality of royalties to one or more recipients, during a minting process of non-fungible tokens (NFTs) upon calculation of the plurality of royalties;

a fundraising module operatively coupled with the royalty distribution module, wherein the fundraising module is configured to:

assign a digital signature to at least one of brand sponsored posts and regular social media posts for fundraising purposes;

dynamically adjust the sale price of NFTs based on user engagement, such as likes, shares, and other interactions;

perform minting non-dynamic or dynamic non-fungible tokens (NFTs) with corresponding fundraising labels to enable a user to buy, trade, and sell social entities to generate interest and donations;

aggregate virtual-world identifiers including social-media accounts with physical-world identity data including at least one of passport data, license data, or biometric data;

generate a cryptographic hash-based identifier associated with the aggregated identity data, the hash-based identifier including a recorded date or time and being updateable using multiple hashes;

record the hash-based identifier on a blockchain public ledger with encryption and a verification certificate to enable transparent identity verification; and associate value-related metrics of digital activity with the recorded hash-based identifier for valuation of a corresponding digital asset or non-fungible token (NFT);

a score generation module operatively coupled to the fundraising module, wherein the score generation module is configured to:

calculate social media voice (SMV) scores for the social entities by analyzing a plurality of relevant variables;

compare the social media voice (SMV) scores of the dynamic non-fungible tokens (NFTs) to determine recommended sale prices for the one or more recipients; and assign the social media voice scores to the one or more recipients for sponsored social entities and dynamic non-fungible token (NFT) drops based on historical data and content analysis; and a management module operatively coupled to the score generation module, wherein the management module is configured to create and distribute digital wills for the digital assets, by minting the digital wills on the blockchain platforms, and modify the digital wills using dynamic non-fungible token (NFT) technology, thereby managing the digital assets.

2. The system of claim 1, wherein the plurality of transaction related data entities comprises the non-fungible tokens (NFTs), and cryptocurrency.

3. The system of claim 1, wherein the one or more inputs comprises at least one of a location and one or more social median post attributes.

4. The system of claim 1, wherein the one or more recipients comprises at least one of a content creator and a charitable organization.

5. The system of claim 1, wherein the royalty distribution module is configured to trigger payments or wallet IDs to distribute assigned royalties upon secondary sale of the non-fungible tokens (NFT).

6. The system of claim 1, wherein the fundraising module is configured to generate a transaction record on the blockchain platform and public ledger for transparency in fundraising activities.

7. The system of claim 1, wherein the plurality of relevant variables comprises at least one of text, images, uniform resource locator (URLs), emojis and hashtags.

8. The system of claim 1, wherein the management module is configured to generate a form to receive will content and convert the form into a smart contract.

9. The system of claim 1, wherein the management module is configured to determine intensity of a like function on a social media platform via at least one of an emoji, an employee fan, and a volunteer fan, a follower, a follower converted to fan and a regular fan.

10. The system of claim 1, wherein processing subsystem comprises a reward generation module operatively coupled with the management module, wherein the reward generation module is configured to automatically mint non-fungible tokens (NFTs) for followers of a social media account when a follower follows an influencer, based on a designated follower collection.

11. The system of claim 10, wherein the reward generation module is configured to distribute non-fungible tokens (NFTs) a wallet of the followers of the social media account wallets upon performing one or more activities comprising following, promoting, engagement and expanding social reach.

12. The system of claim 1, wherein the processing subsystem comprises a copyright regulation module configured to generate copyright terms for the social media entities included in the smart contracts, simplifying agreements between the one or more recipients.

13. A method to manage digital assets comprising:

tracking, by a blockchain based compliance module, a plurality of transaction-related sources on a blockchain platform by associating a plurality of transaction-related data entities;

identifying and storing, by the blockchain based compliance module, transaction-related data corresponding to the plurality of transaction-related sources;

determining and ensuring, by the blockchain based compliance module, compliance with laws applicable to varying jurisdictions and equivalent regulations of a corresponding governing body for compliance using one or more inputs upon identifying the transaction related data;

modifying one or more transactions on the blockchain platform to comply with identified regulations comprising inserting corresponding hashtags, descriptions, or additional data;

calculating, by a royalty distribution module, a plurality of royalties based on a predetermined percentage embedded in a smart contract on the blockchain platform using a distribution algorithm;

assigning, by the royalty distribution module, the plurality of royalties to one or more recipients, during a minting process of non-fungible tokens (NFTs) upon calculation of the plurality of royalties;

assigning, by a fundraising module, a digital signature to at least one of brand sponsored posts and regular social media posts for fundraising purposes;

dynamically adjusting the sale price of NFTs based on user engagement, such as likes, shares, and other interactions;

performing, by the fundraising module, minting non-dynamic or dynamic non-fungible tokens (NFTs) with corresponding fundraising labels to enable a user to buy, trade, and sell social entities to generate interest and donations;

aggregating, by the fundraising module, virtual-world identifiers including social-media accounts with physical-world identity data including at least one of passport data, license data, or biometric data;

generating, by the fundraising module, a cryptographic hash-based identifier associated with the aggregated identity data, the hash-based identifier including a recorded date or time and being updateable using multiple hashes;

recording, by the fundraising module, the hash-based identifier on a blockchain public ledger with encryption and a verification certificate to enable transparent identity verification;

associating, by the fundraising module, value-related metrics of digital activity with the recorded hash-based identifier for valuation of a corresponding digital asset or non-fungible token (NFT);

calculating, by a score generation module, social media voice (SMV) scores for the social entities by analyzing a plurality of relevant variables;

comparing, by the score generation module, the social media voice (SMV) scores of the dynamic non-fungible tokens (NFTs) to determine recommended sale prices for the one or more recipients;

assigning, by the score generation module, the social media voice scores to the one or more recipients for sponsored social entities and dynamic non-fungible token (NFT) drops based on historical data and content analysis; and creating and distributing, by a management module, digital wills for the digital assets, by minting the digital Wills on the blockchain platforms, and modify the digital wills using dynamic non-fungible token (NFT) technology, thereby managing the digital assets.

14. The method of claim 13, comprising automatically minting, by a reward generation module, non-fungible tokens (NFTs) for followers of a social media account when a follower follows an influencer, based on a designated follower collection.

15. The method of claim 13, comprising distributing, by the reward generation module, non-fungible tokens (NFTs) a wallet of the followers of the social media account wallets upon performing one or more activities comprising following, promoting, engagement and expanding social reach.

16. The method of claim 13, comprising generating, by a copyright regulation module, copyright terms for the social media entities included in the smart contracts, simplifying agreements between the one or more recipients.

* * * * *